United States Patent Office 3,050,546
Patented Aug. 21, 1962

3,050,546
PROCESS FOR THE MANUFACTURE OF ACRYLONITRILE
Ernest C. Milberger, Maple Heights, Ohio, assignor to The Standard Oil Company, Cleveland, Ohio, a corporation of Ohio
No Drawing. Filed Feb. 24, 1959, Ser. No. 794,841
4 Claims. (Cl. 260—465.3)

The present invention relates to an improvement in a process for the manufacture of acrylonitrile. More particularly, the invention is directed to an improvement in the manufacture of acrylonitrile by a process which involves the catalytic vapor phase reaction of ammonia, oxygen, and propylene.

The prior art contains many references which deal with the manufacture of acrylonitrile, but most of these references relate to processes employing hydrogen cyanide and acetylene as the initial reactants. The present invention, on the other hand, is to be distinguished from the latter type of process as it is an improvement on a process of the type disclosed in the co-pending application Serial No. 685,352 of James D. Idol, Jr., which was filed in the United States Patent Office on September 20, 1957, now U.S. Patent 2,904,580, and has been assigned to my assignee.

According to the above-identified patent application, acrylonitrile may be produced in good yields by reacting a mixture of propylene, oxygen, and ammonia in the vapor phase at an elevated temperature in the presence of a catalyst. A number of catalysts are disclosed in that application as being suitable for the process, e.g., the bismuth, tin and antimony salts of phosphomolybdic and molybdic acids and bismuth phosphotungstate, and of these bismuth phosphomolybdate is listed as the preferred catalyst. The reaction is conducted at a temperature in the range of 550 to 1000° F., and generally a temperature in the range of about 800 to 950° F. is preferred. The aforesaid application discloses certain operable ranges for the molal ratios of the reactants and these are:

Oxygen-propylene _____ 0.5:1 to 3:1
Ammonia-propylene _____ 0.5:1 to 5:1

The application also discloses that in some instances beneficial effects are obtained by adding water to the reaction mixture. Various other conditions for carrying out the reaction are disclosed in the above-identified application.

One of the byproducts of the process disclosed in the aforesaid application is hydrogen cyanide. The amount of the hydrogen cyanide produced is not large enough in comparison to the amount of acrylonitrile produced to warrant the installation of facilities for its recovery, and while it may be readily disposed of by burning, this step has an adverse effect on the overall economics of the process. Accordingly, it is the object of this invention to provide a process for the manufacture of acrylonitrile from propylene which will minimize the production of hydrogen cyanide as a byproduct of the reaction.

I have discovered that if hydrogen cyanide is added to the feed to the reaction vessel in certain amounts, which will be specified hereinafter, that the net amount of hydrogen cyanide produced in the reactor will be substantially reduced, if not entirely eliminated. Accordingly, my invention, in brief, is a process for the manufacture of acrylonitrile involving a catalytic vapor phase reaction of propylene, oxygen or air, and ammonia in the presence of hydrogen cyanide.

In general, sufficient hydrogen cyanide should be present in the feed to the process to provide a hydrogen cyanide to propylene ratio in the range of about 0.01:1 to about 0.2:1. A preferred ratio of hydrogen cyanide to propylene is about 0.1:1, and this ratio seems to give the best results.

In practice, the process operates in the following manner. A mixture of propylene, oxygen, and ammonia in a certain predetermined ratio is introduced into a catalytic reactor along with a certain amount of hydrogen cyanide. In the product recovery step, hydrogen cyanide is separated from the other products of the reaction and recycled to the reactor so that there is very little, if any, net production of hydrogen cyanide in the process.

More specifically, the product recovery is accomplished by passing the effluent from the reaction, including hydrogen cyanide, to an absorber where the products of the reaction are taken up in a solvent. Fat solvent from the absorber which contains the hydrogen cyanide as well as the other products of the reaction is then subjected to fractionation, such as by distillation, whereby a relatively pure stream of hydrogen cyanide is obtained. A part of this stream is circulated to a point where it may be combined with the fresh feed to the reaction vessel. Since a small amount of hydrogen cyanide may be produced in accordance with the process of my invention, provision should be made for continuously withdrawing excess hydrogen cyanide from the recycle stream so as to prevent the accumulation of hydrogen cyanide in the system.

All of the experiments reported herein were conducted in a carbon steel reactor employing a fluidized catalyst bed. A catalyst comprising 50% bismuth phosphomolybdate and 50% silica was employed in all runs. In the data given below the following definitions were employed:

$$\text{W.w.h.} = \frac{\text{Weight of propylene in the feed per hour}}{\text{Weight of catalyst contacted}}$$

$$\text{Percent conversion} = \frac{\text{Weight of carbon in the product}}{\text{Weight of carbon in the feed}}$$

The invention will be better understood by reference to the following example which is illustrative of the preferred embodiment of my invention.

*Example I*

In this experiment the feed to the reactor had the following composition.

| Ingredients: | Mol percent |
|---|---|
| Propylene | 7.4 |
| Air | 76.4 |
| Ammonia | 7.4 |
| Hydrogen cyanide | 0.7 |
| Water | 8.1 |

The reactor was operated at a pressure of 13 p.s.i.g. and a temperature of 850° F. with a w.w.h. of 0.029. The run was conducted for 8.5 hours. Analysis of the products showed the following conversions.

| Products: | Percent conversion |
|---|---|
| Acrylonitrile | 53.2 |
| Acetonitrile | 8.3 |
| Hydrogen cyanide | 0.8 |

Various other products, such as carbon dioxide and carbon monoxide, also resulted from this reaction but they are not important to this invention.

*Example II*

In another run designed to demonstrate the effect produced by the absence of hydrogen cyanide, the feed to the reactor had the following composition.

| Ingredient: | Mol percent |
|---|---|
| Propylene | 7.2 |
| Air | 77.0 |
| Ammonia | 7.9 |
| Water | 7.9 |

During this run the reactor was operated at a pressure of 13 p.s.i.g. and a temperature of 850° F. with a w.w.h. of 0.028. The run was conducted for 11.1 hours. Analysis of the products showed the following conversions.

| Products: | Percent conversion |
|---|---|
| Acrylonitrile | 50.7 |
| Acetonitrile | 12.3 |
| Hydrogen cyanide | 2.4 |

A comparison of these results with the results obtained in Example I shows that three times as much hydrogen cyanide is produced when hydrogen cyanide is absent from the feed. Even more surprising is the reduction in the amount of acetonitrile produced when hydrogen cyanide is present in the feed.

Ordinarily, one might predict by the law of mass action that the recycle of one of the products of a reaction to the feed to that reaction would result in a decrease in the production of the recycled product. While this law is usually true in a simple chemical reaction, it is not applicable to a heterogeneous catalytic system. In the latter case the effect of recycle of any of the products cannot be predicted and this is particularly true in the present process. For example, the recycle of acetonitrile, which is another byproduct of the process, resulted in an increase in the production of acetonitrile and this result is shown by Example III which follows:

*Example III*

In this run the feed to the reactor had the following composition.

| Ingredients: | Mol percent |
|---|---|
| Propylene | 7.4 |
| Air | 75.7 |
| Ammonia | 7.4 |
| Hydrogen cyanide | 0.7 |
| Acetonitrile | 0.7 |
| Water | 8.1 |

During this run the reactor was operated at a pressure of 13 p.s.i.g. and at a temperature of 850° F. with a w.w.h. of 0.029. The run was conducted for 7.7 hours. Analysis of the products showed the following conversions.

| Products: | Percent conversion |
|---|---|
| Acrylonitrile | 51.3 |
| Acetonitrile | 13.3 |
| Hydrogen cyanide | --- |

The increase in the amount of acetonitrile obtained in this run clearly shows that it is impossible to predict the effect that the recycle of any of the products will have on the reaction.

It will be apparent to those skilled in the art from the foregoing description that many modifications of this process may be made without departing from the spirit or scope of this invention. Accordingly, I desire this application for Letters Patent to cover all such modifications of the process as would reasonably fall within the scope of the appended claims.

I claim:

1. A process for the manufacture of acrylinitrile comprising the step of reacting in the vapor phase a mixture of propylene, ammonia, and oxygen in the presence of a catalyst selected from the group consisting of the bismuth, tin and antimony salts of phosphomolybdic and molybdic acids and bismuth phosphotungstate and an amount of hydrogen cyanide in the range of about 0.01 to 0.2 mol per mol of propylene.

2. A process for the manufacture of acrylinitrile comprising the following steps: (1) reacting in the vapor phase a mixture of propylene, ammonia, air, and an amount of hydrogen cyanide in the range of about 0.01 to 0.2 mol per mol of propylene in the presence of a catalyst selected from the group consisting of the bismuth, tin, and antimony salts of molybdic and phosphomolybdic acids and bismuth phosphotungstate; (2) recovering the products of said reaction and separating therefrom any hydrogen cyanide present in said products, and finally; (3) recycling at least a part of said separated hydrogen cyanide to the feed to step (1) of the process.

3. A process for the manufacture of acrylintrile comprising the following steps: (1) reacting in the vapor phase a mixture of propylene, ammonia, air, water, and an amount of hydrogen cyanide in the range of about 0.01 to 0.2 mol per mol of propylene in the presence of a catalyst selected from the group consisting of the bismuth, tin, and antimony salts of molybdic and phosphomolybdic acids and bismuth phosphotungstate; (2) recovering the products of said reaction and separating therefrom any hydrogen cyanide present in said products, and finally; (3) recycling at least a part of said separated hydrogen cyanide to the feed to step (1) of the process.

4. A process for the manufacture of acrylinitrile comprising the following steps: (1) reacting in the vapor phase a mixture of propylene, ammonia, air, water, and hydrogen cyanide in the presence of a catalyst selected from the group consisting of the bismuth, tin, and antimony salts of molybdic and phosphomolybdic acids and bismuth phosphotungstate; (2) recovering the products of said reaction and separating therefrom any hydrogen cyanide present in said products, and finally; (3) recycling an amount of said separated hydrogen cyanide to the feed to step (1) of the process sufficient to provide a mol ratio of hydrogen cyanide to propylene in the feed of about 0.1:1.

References Cited in the file of this patent

UNITED STATES PATENTS

| 2,481,826 | Cosby | Sept. 13, 1949 |
| 2,671,107 | Beckberger | Mar. 2, 1954 |

UNITED STATES PATENT OFFICE
CERTIFICATE OF CORRECTION

Patent No. 3,050,546                August 21, 1962

Ernest C. Milberger

It is hereby certified that error appears in the above numbered patent requiring correction and that the said Letters Patent should read as corrected below.

Column 4, lines 8, 16, and 40, for "acrylinitrile" read -- acrylonitrile --; same column 4, line 28, for "acrylintrile" read -- acrylonitrile --.

Signed and sealed this 25th day of December 1962.

(SEAL)
Attest:

ERNEST W. SWIDER
Attesting Officer

DAVID L. LADD
Commissioner of Patents